US011481865B2

(12) United States Patent
Kamenetskaya et al.

(10) Patent No.: US 11,481,865 B2
(45) Date of Patent: Oct. 25, 2022

(54) METHODS AND APPARATUS FOR TENSOR OBJECT SUPPORT IN MACHINE LEARNING WORKLOADS

(71) Applicant: QUALCOMM Incorporated, San Diego, CA (US)

(72) Inventors: Elina Kamenetskaya, Belmont, MA (US); Liang Li, San Diego, CA (US); Andrew Evan Gruber, Arlington, MA (US); Jeffrey Leger, Tyngsboro, MA (US); Balaji Calidas, San Diego, CA (US); Ruihao Zhang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/173,643

(22) Filed: Feb. 11, 2021

(65) Prior Publication Data

US 2022/0253969 A1    Aug. 11, 2022

(51) Int. Cl.
*G06T 1/60* (2006.01)
(52) U.S. Cl.
CPC ..................... *G06T 1/60* (2013.01)
(58) Field of Classification Search
CPC ........................................... G06T 1/60
USPC ....................................... 345/552
See application file for complete search history.

(56) References Cited

U.S. PATENT DOCUMENTS 10,339,443 B1 * 7/2019 Medioni ............ H03H 17/0202
2019/0272463 A1    9/2019 Medioni

FOREIGN PATENT DOCUMENTS

CN            108010113 A      5/2018

OTHER PUBLICATIONS

Cheng, Y., et al., "Deepeye: A Deeply Tensor-Compressed Neural Network for Video Comprehension on Terminal Devices", ACM Transactions on Embedded Computing Systems, ACM, New York, NY, US, vol. 19, No. 3, May 16, 2020 (May 16, 2020), XP058677623, pp. 1-25, ISSN: 1539-9087, DOI: 10.1145/3381805, Abstract.
International Search Report and Written Opinion—PCT/US2022/012166—ISA/EPO—dated May 25, 2022.

* cited by examiner

*Primary Examiner* — Jacinta M Crawford
(74) *Attorney, Agent, or Firm* — Campbell Chiang; Procopio, Cory, Hargreaves & Savitch LLP

(57) ABSTRACT

The present disclosure relates to methods and devices for graphics processing including an apparatus, e.g., a GPU. The apparatus may modify at least one texture memory object to support a data structure for one or more tensor objects. The apparatus may also determine one or more supported memory layouts for the one or more tensor objects based on the modified at least one texture memory object. Additionally, the apparatus may access data associated with the one or more tensor objects based on the one or more supported memory layouts, the data for each of the one or more tensor objects corresponding to at least one data instruction. The apparatus may also execute the at least one data instruction based on the accessed data associated with the one or more tensor objects.

24 Claims, 7 Drawing Sheets

| Packing Type (3D to 2D) | Actual 3D Tensor Object | | | Texture Memory Object 2D Representation | |
|---|---|---|---|---|---|
| 3D to 2D Combine Features and Height | W | H | F | W | H*F |
| Group by 4 Features | | | | W*4 | H*F/4 |

| Packing Type (4D to 2D Array) | Actual 4D Tensor Object | | | | Texture Memory Object 3D Representation | | |
|---|---|---|---|---|---|---|---|
| 4D to 3D Combine Features and Batch | W | H | F | B | W | H | F*B |
| Group by 4 Features | | | | | W*4 | H | F/4*B |
| Group by 4 Batches | | | | | W*4 | H | F*B/4 |
| Group by 4 Features and 4 Batches | | | | | W*4*4 | H | F/4*B/4 |

METHODS AND APPARATUS FOR TENSOR OBJECT SUPPORT IN MACHINE LEARNING WORKLOADS

TECHNICAL FIELD

The present disclosure relates generally to processing systems and, more particularly, to one or more techniques for graphics processing.

INTRODUCTION

Computing devices often perform graphics and/or display processing (e.g., utilizing a graphics processing unit (GPU), a central processing unit (CPU), a display processor, etc.) to render and display visual content. Such computing devices may include, for example, computer workstations, mobile phones such as smartphones, embedded systems, personal computers, tablet computers, and video game consoles. GPUs are configured to execute a graphics processing pipeline that includes one or more processing stages, which operate together to execute graphics processing commands and output a frame. A central processing unit (CPU) may control the operation of the GPU by issuing one or more graphics processing commands to the GPU. Modern day CPUs are typically capable of executing multiple applications concurrently, each of which may need to utilize the GPU during execution. A display processor is configured to convert digital information received from a CPU to analog values and may issue commands to a display panel for displaying the visual content. A device that provides content for visual presentation on a display may utilize a GPU and/or a display processor.

A GPU of a device may be configured to perform the processes in a graphics processing pipeline. Further, a display processor or display processing unit (DPU) may be configured to perform the processes of display processing. However, with the advent of wireless communication and smaller, handheld devices, there has developed an increased need for improved graphics or display processing.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. The apparatus may be a graphics processing unit (GPU) or any apparatus that can perform graphics processing. The apparatus may modify at least one texture memory object to support a data structure for one or more tensor objects. The apparatus may also determine one or more supported memory layouts for the one or more tensor objects based on the modified at least one texture memory object. The apparatus may also convert the data associated with the one or more tensor objects based on the one or more supported memory layouts. Additionally, the apparatus may implement the one or more supported memory layouts for the one or more tensor objects. The apparatus may also access data associated with the one or more tensor objects based on the one or more supported memory layouts, the data for each of the one or more tensor objects corresponding to at least one data instruction. Moreover, the apparatus may store at least some of the data associated with the one or more tensor objects. The apparatus may also execute the at least one data instruction based on the accessed data associated with the one or more tensor objects.

The details of one or more examples of the disclosure are set forth in the accompanying drawings and the description below. Other features, objects, and advantages of the disclosure will be apparent from the description and drawings, and from the claims.

BRIEF DESCRIPTION OF DRAWINGS

FIG. 4A is a diagram illustrating tensor object data for graphics processing in accordance with one or more techniques of this disclosure.

FIG. 4B is a diagram illustrating tensor object data for graphics processing in accordance with one or more techniques of this disclosure.

DETAILED DESCRIPTION

Figure 1:
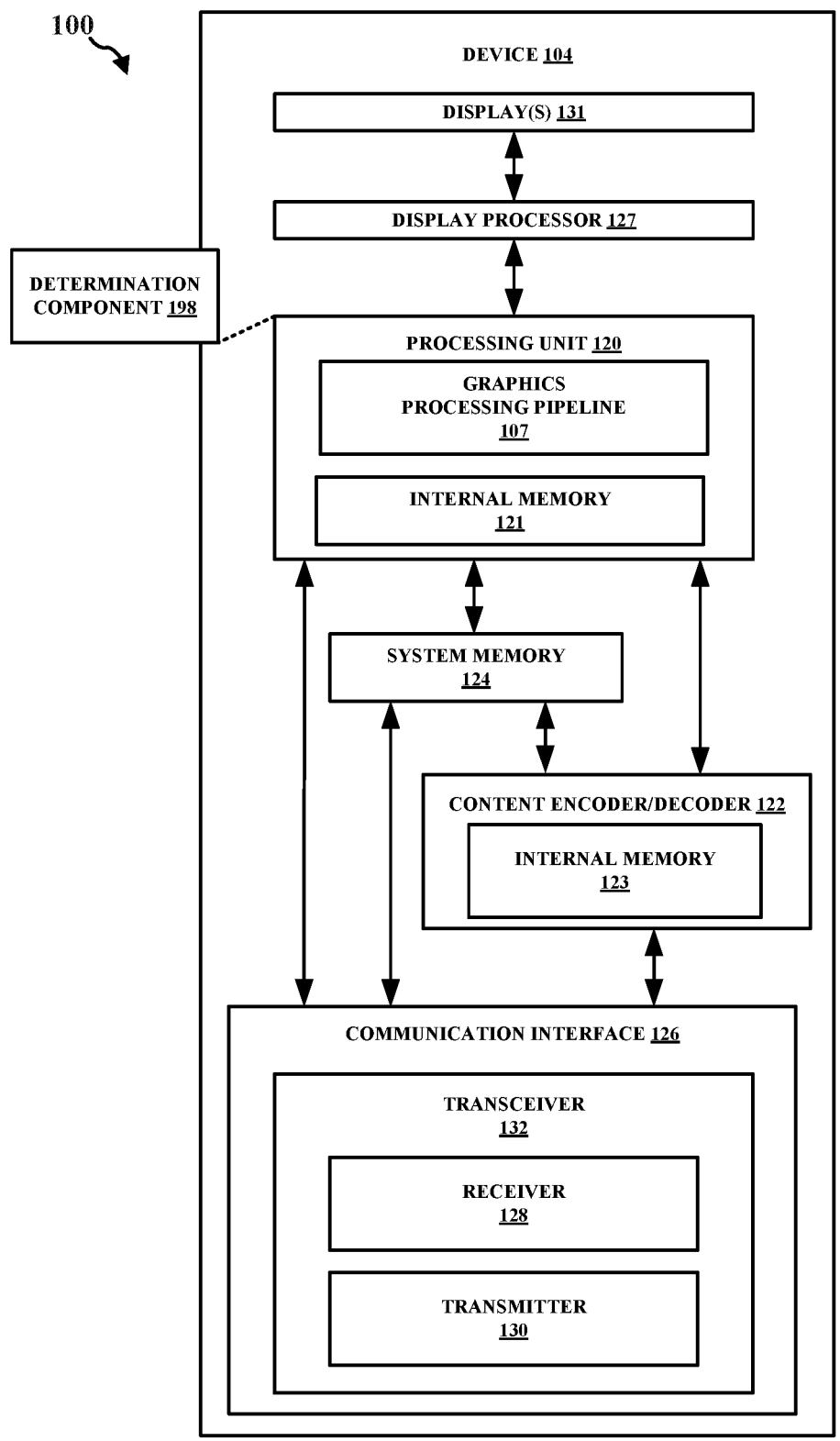
FIG. 1 is a block diagram that illustrates an example content generation system in accordance with one or more techniques of this disclosure.

In some aspects of graphics processing, when processing data from a tensor object, the data layout that corresponds to a memory may not correspond to the data layout of a texture object. For example, in order to efficiently consume data at a memory, it may be beneficial for the data to be in a certain format. In some instances, the data format for the texture object may not be efficiently stored into a data format for the memory. In order to utilize pre-existing texture objects to store memory data, it may be beneficial if the data is converted in order to allow for successful storage. Some approaches of dimension/data packing and data interleaving may have a number of limitations. Each of these limitations may result in additional shader instructions which may reduce performance and/or waste power at the GPU. Aspects of the present disclosure may provide for dimension/data packing and data interleaving that can reduce or optimize the amount of shader instructions at a GPU. For instance, aspects of the present disclosure may allow tensor object access inside the shader code directly, e.g., using raw 3D or 4D coordinates of the shader code, such as without consideration for combining dimensions or memory efficiency packing. Additionally, aspects of the present disclosure may utilize pre-existing texture objects to store memory data, such as by converting the data in order to allow for successful storage. For example, mapping or converting a 3D or 4D object onto an existing texture memory object may allow the data to be stored in memory.

Various aspects of systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of this disclosure to those skilled in the art. Based on the teachings herein one skilled in the art should appreciate that the scope of this disclosure is intended to cover any aspect of the systems, apparatuses, computer program products, and methods disclosed herein, whether implemented independently of, or combined with, other aspects of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. Any aspect disclosed herein may be embodied by one or more elements of a claim.

Although various aspects are described herein, many variations and permutations of these aspects fall within the scope of this disclosure. Although some potential benefits and advantages of aspects of this disclosure are mentioned, the scope of this disclosure is not intended to be limited to particular benefits, uses, or objectives. Rather, aspects of this disclosure are intended to be broadly applicable to different wireless technologies, system configurations, networks, and transmission protocols, some of which are illustrated by way of example in the figures and in the following description. The detailed description and drawings are merely illustrative of this disclosure rather than limiting, the scope of this disclosure being defined by the appended claims and equivalents thereof.

Several aspects are presented with reference to various apparatus and methods. These apparatus and methods are described in the following detailed description and illustrated in the accompanying drawings by various blocks, components, circuits, processes, algorithms, and the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors (which may also be referred to as processing units). Examples of processors include microprocessors, microcontrollers, graphics processing units (GPUs), general purpose GPUs (GPGPUs), central processing units (CPUs), application processors, digital signal processors (DSPs), reduced instruction set computing (RISC) processors, systems-on-chip (SOC), baseband processors, application specific integrated circuits (ASICs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software can be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise. The term application may refer to software. As described herein, one or more techniques may refer to an application, i.e., software, being configured to perform one or more functions. In such examples, the application may be stored on a memory, e.g., on-chip memory of a processor, system memory, or any other memory. Hardware described herein, such as a processor may be configured to execute the application. For example, the application may be described as including code that, when executed by the hardware, causes the hardware to perform one or more techniques described herein. As an example, the hardware may access the code from a memory and execute the code accessed from the memory to perform one or more techniques described herein. In some examples, components are identified in this disclosure. In such examples, the components may be hardware, software, or a combination thereof. The components may be separate components or sub-components of a single component.

Accordingly, in one or more examples described herein, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In general, this disclosure describes techniques for having a graphics processing pipeline in a single device or multiple devices, improving the rendering of graphical content, and/or reducing the load of a processing unit, i.e., any processing unit configured to perform one or more techniques described herein, such as a GPU. For example, this disclosure describes techniques for graphics processing in any device that utilizes graphics processing. Other example benefits are described throughout this disclosure.

As used herein, instances of the term "content" may refer to "graphical content," "image," and vice versa. This is true regardless of whether the terms are being used as an adjective, noun, or other parts of speech. In some examples, as used herein, the term "graphical content" may refer to a content produced by one or more processes of a graphics processing pipeline. In some examples, as used herein, the term "graphical content" may refer to a content produced by a processing unit configured to perform graphics processing. In some examples, as used herein, the term "graphical content" may refer to a content produced by a graphics processing unit.

In some examples, as used herein, the term "display content" may refer to content generated by a processing unit configured to perform displaying processing. In some examples, as used herein, the term "display content" may refer to content generated by a display processing unit. Graphical content may be processed to become display content. For example, a graphics processing unit may output graphical content, such as a frame, to a buffer (which may be referred to as a framebuffer). A display processing unit may read the graphical content, such as one or more frames from the buffer, and perform one or more display processing techniques thereon to generate display content. For example, a display processing unit may be configured to perform composition on one or more rendered layers to generate a frame. As another example, a display processing unit may be configured to compose, blend, or otherwise combine two or more layers together into a single frame. A display processing unit may be configured to perform scaling, e.g., upscaling or downscaling, on a frame. In some examples, a frame may refer to a layer. In other examples, a frame may refer to two or more layers that have already been blended together to form the frame, i.e., the frame includes two or more layers, and the frame that includes two or more layers may subsequently be blended.

FIG. 1 is a block diagram that illustrates an example content generation system 100 configured to implement one or more techniques of this disclosure. The content generation system 100 includes a device 104. The device 104 may include one or more components or circuits for performing various functions described herein. In some examples, one or more components of the device 104 may be components of an SOC. The device 104 may include one or more components configured to perform one or more techniques of this disclosure. In the example shown, the device 104 may include a processing unit 120, a content encoder/decoder 122, and a system memory 124. In some aspects, the device 104 can include a number of optional components, e.g., a communication interface 126, a transceiver 132, a receiver 128, a transmitter 130, a display processor 127, and one or more displays 131. Reference to the display 131 may refer to the one or more displays 131. For example, the display 131 may include a single display or multiple displays. The display 131 may include a first display and a second display. The first display may be a left-eye display and the second display may be a right-eye display. In some examples, the first and second display may receive different frames for presentment thereon. In other examples, the first and second display may receive the same frames for presentment thereon. In further examples, the results of the graphics processing may not be displayed on the device, e.g., the first and second display may not receive any frames for presentment thereon. Instead, the frames or graphics processing results may be transferred to another device. In some aspects, this can be referred to as split-rendering.

The processing unit 120 may include an internal memory 121. The processing unit 120 may be configured to perform graphics processing, such as in a graphics processing pipeline 107. The content encoder/decoder 122 may include an internal memory 123. In some examples, the device 104 may include a display processor, such as the display processor 127, to perform one or more display processing techniques on one or more frames generated by the processing unit 120 before presentment by the one or more displays 131. The display processor 127 may be configured to perform display processing. For example, the display processor 127 may be configured to perform one or more display processing techniques on one or more frames generated by the processing unit 120. The one or more displays 131 may be configured to display or otherwise present frames processed by the display processor 127. In some examples, the one or more displays 131 may include one or more of: a liquid crystal display (LCD), a plasma display, an organic light emitting diode (OLED) display, a projection display device, an augmented reality display device, a virtual reality display device, a head-mounted display, or any other type of display device.

Memory external to the processing unit 120 and the content encoder/decoder 122, such as system memory 124, may be accessible to the processing unit 120 and the content encoder/decoder 122. For example, the processing unit 120 and the content encoder/decoder 122 may be configured to read from and/or write to external memory, such as the system memory 124. The processing unit 120 and the content encoder/decoder 122 may be communicatively coupled to the system memory 124 over a bus. In some examples, the processing unit 120 and the content encoder/decoder 122 may be communicatively coupled to each other over the bus or a different connection.

The content encoder/decoder 122 may be configured to receive graphical content from any source, such as the system memory 124 and/or the communication interface 126. The system memory 124 may be configured to store received encoded or decoded graphical content. The content encoder/decoder 122 may be configured to receive encoded or decoded graphical content, e.g., from the system memory 124 and/or the communication interface 126, in the form of encoded pixel data. The content encoder/decoder 122 may be configured to encode or decode any graphical content.

The internal memory 121 or the system memory 124 may include one or more volatile or non-volatile memories or storage devices. In some examples, internal memory 121 or the system memory 124 may include RAM, SRAM, DRAM, erasable programmable ROM (EPROM), electrically erasable programmable ROM (EEPROM), flash memory, a magnetic data media or an optical storage media, or any other type of memory.

The internal memory 121 or the system memory 124 may be a non-transitory storage medium according to some examples. The term "non-transitory" may indicate that the storage medium is not embodied in a carrier wave or a propagated signal. However, the term "non-transitory" should not be interpreted to mean that internal memory 121 or the system memory 124 is non-movable or that its contents are static. As one example, the system memory 124 may be removed from the device 104 and moved to another device. As another example, the system memory 124 may not be removable from the device 104.

The processing unit 120 may be a central processing unit (CPU), a graphics processing unit (GPU), a general purpose GPU (GPGPU), or any other processing unit that may be configured to perform graphics processing. In some examples, the processing unit 120 may be integrated into a motherboard of the device 104. In some examples, the processing unit 120 may be present on a graphics card that is installed in a port in a motherboard of the device 104, or may be otherwise incorporated within a peripheral device configured to interoperate with the device 104. The processing unit 120 may include one or more processors, such as one or more microprocessors, GPUs, application specific integrated circuits (ASICs), field programmable gate arrays (FPGAs), arithmetic logic units (ALUs), digital signal processors (DSPs), discrete logic, software, hardware, firmware, other equivalent integrated or discrete logic circuitry, or any combinations thereof. If the techniques are implemented partially in software, the processing unit 120 may store instructions for the software in a suitable, non-transitory computer-readable storage medium, e.g., internal memory 121, and may execute the instructions in hardware using one or more processors to perform the techniques of this disclosure. Any of the foregoing, including hardware, software, a combination of hardware and software, etc., may be considered to be one or more processors.

The content encoder/decoder 122 may be any processing unit configured to perform content decoding. In some examples, the content encoder/decoder 122 may be integrated into a motherboard of the device 104. The content encoder/decoder 122 may include one or more processors, such as one or more microprocessors, application specific integrated circuits (ASICs), field programmable gate arrays (FPGAs), arithmetic logic units (ALUs), digital signal processors (DSPs), video processors, discrete logic, software, hardware, firmware, other equivalent integrated or discrete logic circuitry, or any combinations thereof. If the techniques are implemented partially in software, the content encoder/decoder 122 may store instructions for the software in a suitable, non-transitory computer-readable storage medium, e.g., internal memory 123, and may execute the instructions in hardware using one or more processors to perform the techniques of this disclosure. Any of the foregoing, including hardware, software, a combination of hardware and software, etc., may be considered to be one or more processors.

In some aspects, the content generation system 100 can include an optional communication interface 126. The communication interface 126 may include a receiver 128 and a transmitter 130. The receiver 128 may be configured to perform any receiving function described herein with respect to the device 104. Additionally, the receiver 128 may be configured to receive information, e.g., eye or head position information, rendering commands, or location information, from another device. The transmitter 130 may be configured to perform any transmitting function described herein with respect to the device 104. For example, the transmitter 130 may be configured to transmit information to another device, which may include a request for content. The receiver 128 and the transmitter 130 may be combined into a transceiver 132. In such examples, the transceiver 132 may be configured to perform any receiving function and/or transmitting function described herein with respect to the device 104.

Referring again to FIG. 1, in certain aspects, the processing unit 120 may include a determination component 198 configured to modify at least one texture memory object to support a data structure for one or more tensor objects. The determination component 198 may also be configured to determine one or more supported memory layouts for the one or more tensor objects based on the modified at least one texture memory object. The determination component 198 may also be configured to convert the data associated with the one or more tensor objects based on the one or more supported memory layouts. The determination component 198 may also be configured to implement the one or more supported memory layouts for the one or more tensor objects. The determination component 198 may also be configured to access data associated with the one or more tensor objects based on the one or more supported memory layouts, the data for each of the one or more tensor objects corresponding to at least one data instruction. The determination component 198 may also be configured to store at least some of the data associated with the one or more tensor objects. The determination component 198 may also be configured to execute the at least one data instruction based on the accessed data associated with the one or more tensor objects. Although the following description may be focused on graphics processing, the concepts described herein may be applicable to other similar processing techniques.

As described herein, a device, such as the device 104, may refer to any device, apparatus, or system configured to perform one or more techniques described herein. For example, a device may be a server, a base station, user equipment, a client device, a station, an access point, a computer, e.g., a personal computer, a desktop computer, a laptop computer, a tablet computer, a computer workstation, or a mainframe computer, an end product, an apparatus, a phone, a smart phone, a server, a video game platform or console, a handheld device, e.g., a portable video game device or a personal digital assistant (PDA), a wearable computing device, e.g., a smart watch, an augmented reality device, or a virtual reality device, a non-wearable device, a display or display device, a television, a television set-top box, an intermediate network device, a digital media player, a video streaming device, a content streaming device, an in-car computer, any mobile device, any device configured to generate graphical content, or any device configured to perform one or more techniques described herein. Processes herein may be described as performed by a particular component (e.g., a GPU), but, in further embodiments, can be performed using other components (e.g., a CPU), consistent with disclosed embodiments.

GPUs can process multiple types of data or data packets in a GPU pipeline. For instance, in some aspects, a GPU can process two types of data or data packets, e.g., context register packets and draw call data. A context register packet can be a set of global state information, e.g., information regarding a global register, shading program, or constant data, which can regulate how a graphics context will be processed. For example, context register packets can include information regarding a color format. In some aspects of context register packets, there can be a bit that indicates which workload belongs to a context register. Also, there can be multiple functions or programming running at the same time and/or in parallel. For example, functions or programming can describe a certain operation, e.g., the color mode or color format. Accordingly, a context register can define multiple states of a GPU.

Context states can be utilized to determine how an individual processing unit functions, e.g., a vertex fetcher (VFD), a vertex shader (VS), a shader processor, or a geometry processor, and/or in what mode the processing unit functions. In order to do so, GPUs can use context registers and programming data. In some aspects, a GPU can generate a workload, e.g., a vertex or pixel workload, in the pipeline based on the context register definition of a mode or state. Certain processing units, e.g., a VFD, can use these states to determine certain functions, e.g., how a vertex is assembled. As these modes or states can change, GPUs may need to change the corresponding context. Additionally, the workload that corresponds to the mode or state may follow the changing mode or state.

Figure 2:
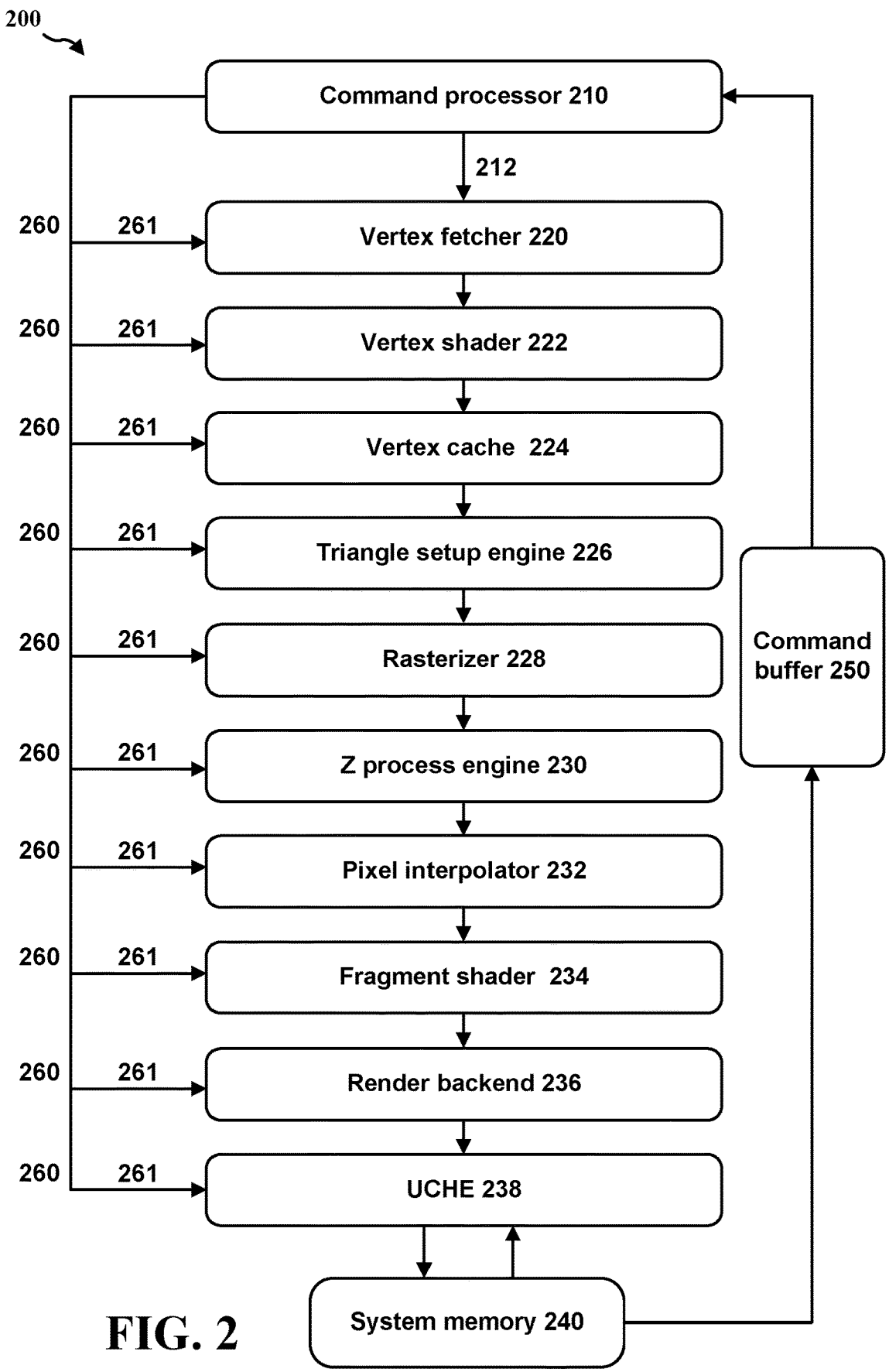
FIG. 2 illustrates an example GPU in accordance with one or more techniques of this disclosure.

FIG. 2 illustrates an example GPU 200 in accordance with one or more techniques of this disclosure. As shown in FIG. 2, GPU 200 includes command processor (CP) 210, draw call packets 212, VFD 220, VS 222, vertex cache (VPC) 224, triangle setup engine (TSE) 226, rasterizer (RAS) 228, Z process engine (ZPE) 230, pixel interpolator (PI) 232, fragment shader (FS) 234, render backend (RB) 236, level 2 (L2) cache (UCHE) 238, and system memory 240. Although FIG. 2 displays that GPU 200 includes processing units 220-238, GPU 200 can include a number of additional processing units. Additionally, processing units 220-238 are merely an example and any combination or order of processing units can be used by GPUs according to the present disclosure. GPU 200 also includes command buffer 250, context register packets 260, and context states 261.

As shown in FIG. 2, a GPU can utilize a CP, e.g., CP 210, or hardware accelerator to parse a command buffer into context register packets, e.g., context register packets 260, and/or draw call data packets, e.g., draw call packets 212. The CP 210 can then send the context register packets 260 or draw call data packets 212 through separate paths to the processing units or blocks in the GPU. Further, the command buffer 250 can alternate different states of context registers and draw calls. For example, a command buffer can be structured in the following manner: context register of context N, draw call(s) of context N, context register of context N+1, and draw call(s) of context N+1.

Some aspects of graphics processing may utilize a number of different data structures, e.g., tensor objects or tensors. Tensor objects refer to multi-dimensional data structures used in machine learning applications, e.g., a neural network (NN) or a deep neural network (DNN). A tensor object can correspond to data, such as original data, pre-trained weights, or a result of a neural network layer. Tensor objects can be associated with any type of dimension, but typical DNN applications use one-dimensional (1D), two-dimensional (2D), three-dimensional (3D), and/or four-dimensional (4D) tensors.

Figure 3:
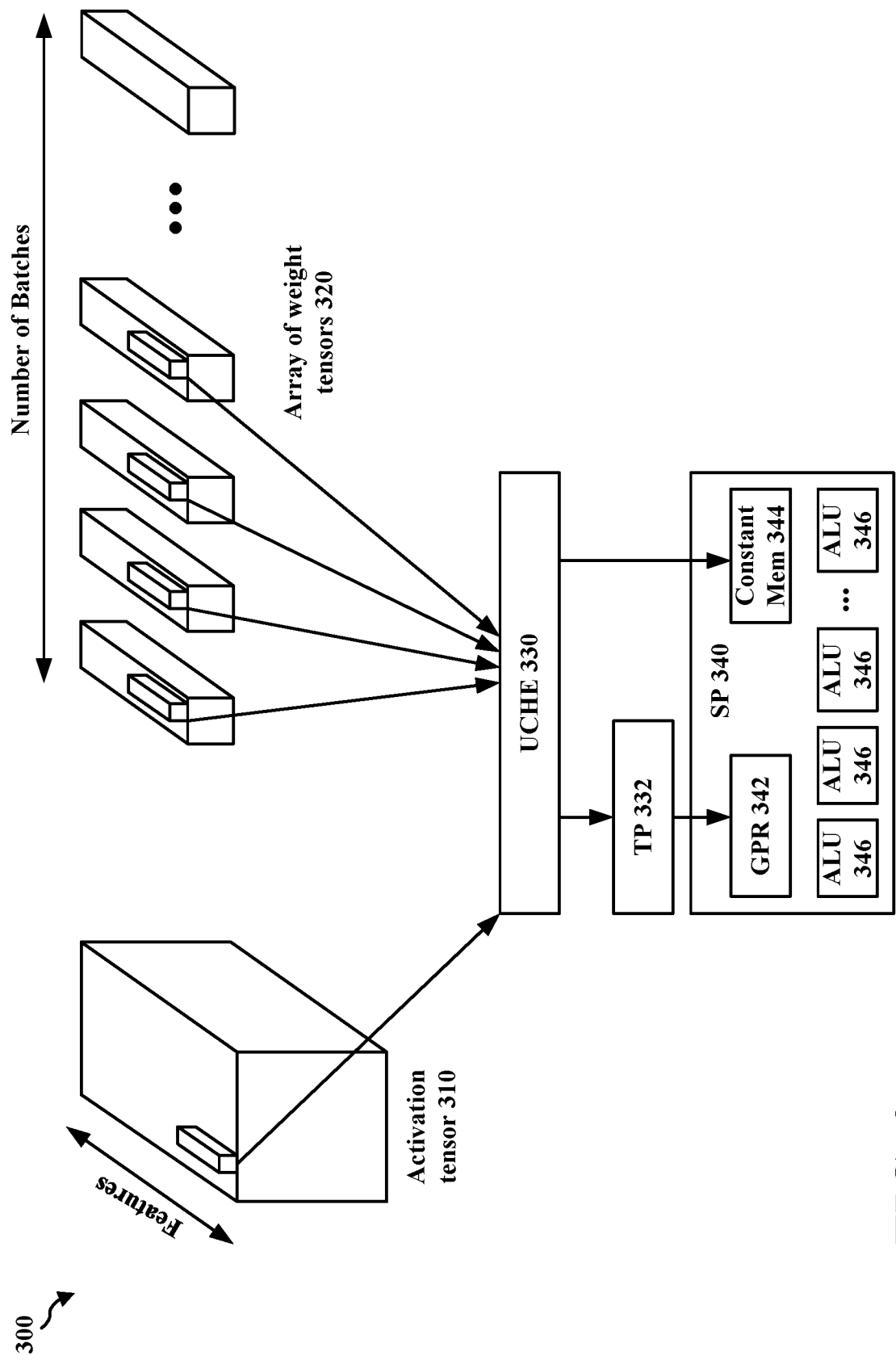
FIG. 3 is a diagram illustrating a data storage process for graphics processing in accordance with one or more techniques of this disclosure.

FIG. 3 is a diagram 300 illustrating an example data storage process for graphics processing. FIG. 3 shows two types of tensors used as the input of a typical DNN convolution layer: "activation" tensors, e.g., activation tensor 310, and "weight" tensors, e.g., array of weight tensors 320. Diagram 300 also includes UCHE 330, texture pipe (TP) 332, shader processor (SP) 340, general purpose register (GPR) 342, constant memory 344, and arithmetic logic units (ALUs) 346. As shown in FIG. 3, the output of the processing in diagram 300 may be another tensor object. In the example in FIG. 3, the input activation tensor 310 is a 3D object represented by its width, height, and the number of features (i.e., the depth). As further shown in FIG. 3, the weight tensors 320 may correspond to a 4D object, which is represented as an array of 3D weights. Each of the 3D weights may have an identical width, height, and number of features. In these instances, the individual 3D weight may be referred to as a "batch" in DNN terminology.

FIG. 3 shows that data for the activation tensor 310 and the weight tensors 320 is being consumed by hardware, i.e., a hardware flow. The activation data for the activation tensor 310 and the weight data for the weight tensors 320 can be loaded by a cache, e.g., UCHE 330, and sent to a texture pipe, e.g., TP 332. The activation data can then be sent to a general purpose register, e.g., GPR 342, or other storage of the shader processor, e.g., SP 340. The weight data can be sent as a load command into constant memory 344 in the SP 340. Once the data has been loaded into the SP 340 of the GPU, the GPU may perform some arithmetic logic unit (ALU) operations, e.g., with ALUs 346, such as a convolution operation or matrix multiplication. So the activation data and weight data can be loaded into the SP 340, and then some ALU operations may be performed on the data. The output of these operations may be processed in order to output a tensor object for another step in the process.

In some aspects of graphics processing, certain approaches may not utilize an explicit tensor object abstraction layer. However, it may be possible to use texture memory objects to store tensor data if the texture memory object is mapped to a standard 1D, 2D, or 3D texture memory object. Additionally, due to the nature of convolution layer algorithms, 3D and 4D tensors may be represented in memory using special interleaved or packed data formats.

FIGS. 4A and 4B are diagrams 400 and 410, respectively, illustrating tensor object data for graphics processing. More specifically, FIGS. 4A and 4B illustrate tensor object data that may be stored in memory at a GPU. FIG. 4A shows data for a 3D tensor object that is represented in memory using different data packing formats, e.g., a 3D packing type to a 2D packing type. FIG. 4A also shows the actual 3D tensor object dimensions including a width (W), height (H), and feature (F) (e.g., depth). FIG. 4A also shows the texture memory object 2D representation, which may correspond to packing the data from the 3D object into a 2D representation. As shown in FIG. 4A, the texture memory object 2D representation may be partitioned to map the data, such as by multiplying the width by a factor of 4, as well as dividing the feature by a factor of 4.

FIG. 4B illustrates data for a 4D tensor object that is represented in memory using different data packing formats, e.g., packing a 4D texture object to a 2D array. FIG. 4B also shows the actual 4D tensor object including four dimensions, e.g., a width (W), height (H), feature (F) (e.g., depth), and batch (B). Further, FIG. 4B shows the texture memory object 3D representation after data packing. The texture memory object 3D representation may be partitioned to map the data, such as by multiplying the width by a factor of 4, as well as dividing the feature or batch by a factor of 4. In some aspects, the data packing formats shown in FIG. 4B may be utilized if a fourth dimension is not available.

In some aspects of graphics processing, when processing data from a tensor object, the data layout that corresponds to a memory may not correspond to the data layout of a texture object. For example, in order to efficiently consume data at a memory, it may be beneficial for the data to be in a certain format. In some instances, the data format for the texture object may not be efficiently stored into a data format for the memory. In order to utilize pre-existing texture objects to store memory data, it may be beneficial if the data is converted in order to allow for successful storage.

Some approaches of dimension/data packing and data interleaving may have a number of limitations. For instance, a special addressing calculation may need to be performed explicitly in the shader processor (SP) in order to map each 3D or 4D tensor coordinate down to its 2D or 3D representation. Further, out-of-bound (OOB) checking may need to be performed explicitly in the shader processor. Additionally, while the texture processor (TP) may contain multiple edge mode condition checkers, these condition checkers may not be leveraged because multiple dimensions may be packed into a single dimension. Each of these limitations may result in additional shader instructions which may reduce performance and/or waste power at the GPU. Accordingly, it may be beneficial to provide dimension packing and data interleaving that can reduce or optimize the amount of shader instructions at a GPU.

Aspects of the present disclosure may provide for dimension/data packing and data interleaving that can reduce or optimize the amount of shader instructions at a GPU. For instance, aspects of the present disclosure may allow tensor object access inside the shader code directly, e.g., using raw 3D or 4D coordinates of the shader code, such as without consideration for combining dimensions or memory efficiency packing. Additionally, aspects of the present disclosure may utilize pre-existing texture objects to store memory data, such as by converting the data in order to allow for successful storage. For example, mapping or converting a 3D or 4D object onto an existing texture memory object may allow the data to be stored in memory.

In some aspects of the present disclosure, tensor object structures may be defined using existing texture memory objects. Moreover, tensor object structures may be used to read and write data efficiently with existing or additional shader instructions. For example, these existing or additional shader instructions may be instructions that utilize the texture pipe (TP). Further shader instructions may be a LOAD/STORE instruction that uses the shader pipe (SP) to output to a GPR, local memory, a constant buffer, or a global memory.

In some instances, to avoid certain limitations of texture memory objects, aspects of the present disclosure may allow for texture memory objects to support data for tensor memory objects. For instance, texture memory objects may allow for the addition of a fourth dimension, which can be used to support tensor objects. Accordingly, aspects of the present disclosure may allow for certain data or dimensions to be utilized with both texture objects and tensor objects. So certain memory layouts that are utilized with tensor objects may also be utilized with texture objects.

In some aspects, a texture memory object may be modified or adjusted in order to support a data structure for a tensor object. For instance, texture memory objects, e.g., 2D objects or pictures, may be adjusted or modified to support a data structure for tensor objects, e.g., 3D or 4D objects. So the capability of texture memory objects may be extended to support tensor objects, such as by modifying the texture memory objects. Accordingly, aspects of the present disclosure may allow for tensor object structures to be defined using existing texture memory objects.

Additionally, in some aspects, in order to allow tensor objects access inside the shader code directly, e.g., using raw 3D or 4D coordinates of shader code, aspects of the present disclosure may perform a number of instructions. For instance, aspects of the present disclosure may perform modifications to a texture memory object structure which may allow for differentiation between a regular texture memory object and a tensor object. This may also allow for the addition of a list of supported layouts and/or packing types for memory efficient data access. So aspects of the present disclosure may set or label texture memory objects as tensor objects. Accordingly, texture memory objects may be modified or adjusted to support a data structure for one or more tensor objects.

The present disclosure may also provide a list of layouts that correspond to a memory access based on setting or labeling the texture memory objects as tensor objects. This list of layouts and packing types may allow aspects of the present disclosure to map the dimensions for the data packing. For example, in some instances, a texture memory object may be treated as a tensor object, such as if a certain mode is activated. As such, if a certain mode is activated, a texture memory object may correspond to a tensor object.

Aspects of the present disclosure may also allow for efficient use of TP out-of-bound (OOB) checking on a number of dimensions, e.g., width, height, and feature dimensions, based on available object support, e.g., 2D array object support. This OOB checking may be due to the fact that data is unpacked. Moreover, aspects of the present disclosure may allow for tensor data grouping by an amount of scalar values, e.g., four (4) scalar values, in order to form different pixel-like formats, e.g., Vector4 or red green blue alpha (RGBA) pixel-like formats. These pixel-like formats may be leveraged by ALU units for the TP and the SP to allow for coalesced read and write access.

Figure 5B:
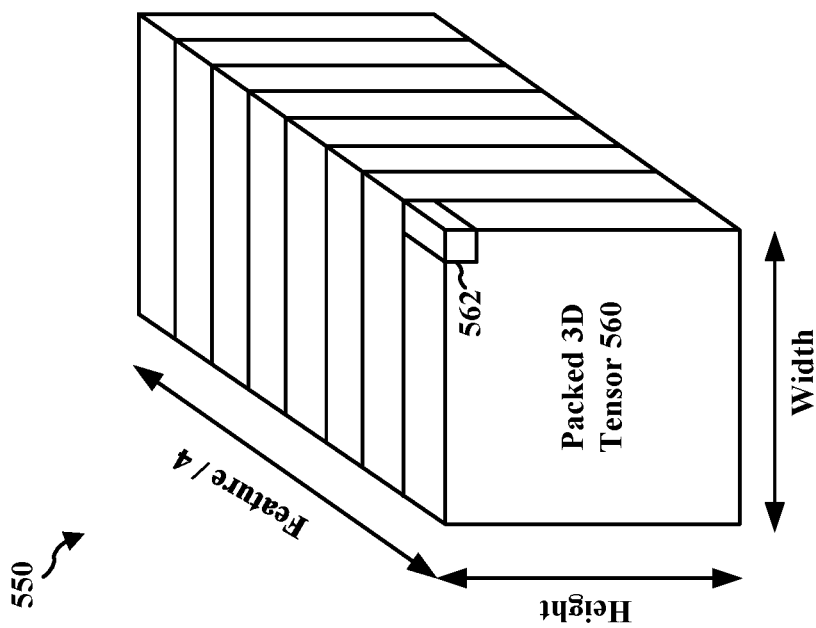
FIG. 5B is a diagram illustrating a tensor object for graphics processing in accordance with one or more techniques of this disclosure.
Figure 5A:
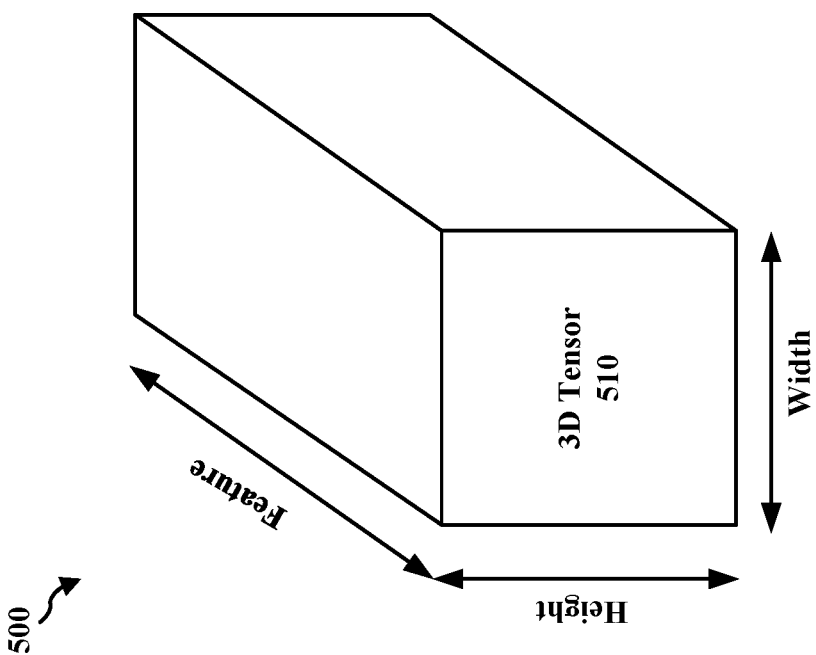
FIG. 5A is a diagram illustrating a tensor object for graphics processing in accordance with one or more techniques of this disclosure.

FIGS. 5A and 5B are diagrams 500 and 550, respectively, illustrating a tensor packing process for graphics processing in accordance with one or more techniques of this disclosure. FIGS. 5A and 5B shows an example of a tensor packing process starting with an original 3D tensor 510 in FIG. 5A and ending at a packed 3D tensor 560 in FIG. 5B. FIG. 5A illustrates an original 3D tensor 510 including different dimensions, e.g., width, height, and feature. FIG. 5B shows a packed 3D tensor 560 including different dimensions, e.g., width, height, and feature. As shown in FIG. 5B, the packed 3D tensor 560 can include a number of features of the original 3D tensor 510. Additionally, FIG. 5B shows a texel 562, e.g., a single RGBA texel, of the packed tensor 560, which can hold a number of features, e.g., four (4) features, from the original tensor 510. For example, the feature dimension may be divided by a number, e.g., four (4), as the texel 562 may have that number of features, e.g., four (4) features, in the depth dimension.

In some aspects, the texel 562 in FIG. 5B may include data for each of the features or dimensions in the tensor 510 in FIG. 5A. For example, if there are a number of features, e.g., four features, the texel 562 may include each of these features. By doing so, different units in the GPU, e.g., ALUs, may begin processing the information for each of the features. So aspects of the present disclosure may include a hardware-friendly layout to pack multiple features together into a unit, e.g., a pixel or a texel, in order to map these features onto hardware. Accordingly, aspects of the present disclosure may optimize or improve the efficiency of GPUs.

As shown in FIGS. 5A and 5B, data for a number of features in an original tensor object may correspond to a memory layout or a supported memory layout. The data for the number of dimensions, e.g., width, height, and/or feature dimensions, in the original tensor object may correspond to a particular unit, e.g., a pixel or a texel, in a packed tensor object. Each unit in the packed tensor object, e.g., a pixel or a texel, may process the data for each dimension, such that the data is processed on a dimension-by-dimension basis. Accordingly, the data for each dimension in the original tensor object may be processed on a unit basis, e.g., a pixel or a texel unit, in the packed tensor object, and the data may be processed within each unit in the packed tensor object on a dimension-by-dimension basis.

Figure 6:
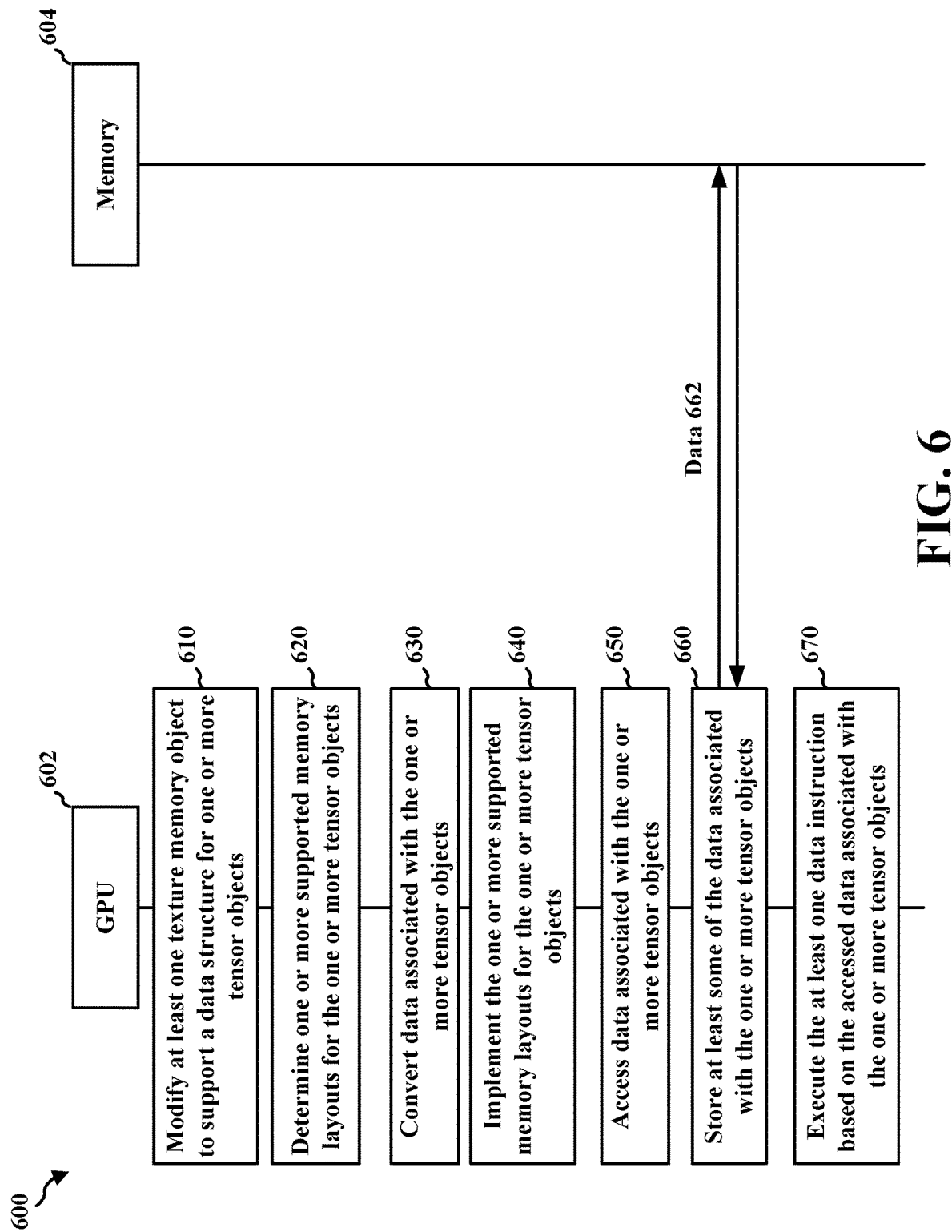
FIG. 6 is a communication flow diagram illustrating example communications between a GPU and a memory in accordance with one or more techniques of this disclosure.

FIG. 6 is a communication flow diagram 600 of graphics processing in accordance with one or more techniques of this disclosure. As shown in FIG. 6, diagram 600 includes example communications between a GPU 602, e.g., a shader processor or a texture processor at a GPU, and a memory 604, e.g., a memory at a GPU, in accordance with one or more techniques of this disclosure.

At 610, GPU 602 may modify at least one texture memory object to support a data structure for one or more tensor objects. In some aspects, modifying the at least one texture memory object may include at least one of rearranging data for the one or more tensor objects or mapping data for the one or more tensor objects. Additionally, the at least one texture memory object may correspond to a two-dimensional (2D) structure or a three-dimensional (3D) structure, and the one or more tensor objects may correspond to a three-dimensional (3D) structure or a four-dimensional (4D) structure.

At 620, GPU 602 may determine one or more supported memory layouts for the one or more tensor objects based on the modified at least one texture memory object. The one or more supported memory layouts may correspond to a data structure for the one or more tensor objects. Also, the one or more supported memory layouts may be associated with one or more packing types for the one or more tensor objects. Further, the one or more supported memory layouts may be associated with at least one dimension, the at least one dimension including at least one of a width, a height, a feature, or a batch.

At 630, GPU 602 may convert data associated with the one or more tensor objects, e.g., data 662, based on the one or more supported memory layouts. The data associated with the one or more tensor objects, e.g., data 662, may be accessed by a shader processor (SP) or a texture processor (TP).

At 640, GPU 602 may implement the one or more supported memory layouts for the one or more tensor objects.

At 650, GPU 602 may access data associated with the one or more tensor objects, e.g., data 662, based on the one or more supported memory layouts, the data for each of the one or more tensor objects corresponding to at least one data instruction. The data associated with the one or more tensor objects, e.g., data 662, may be accessed based on at least one request for the data.

At 660, GPU 602 may store at least some of the data associated with the one or more tensor objects, e.g., data 662. In some instances, the at least some of the data, e.g., data 662, may be stored in one or more general purpose registers (GPRs) or on-chip memory.

At 670, GPU 602 may execute the at least one data instruction based on the accessed data associated with the one or more tensor objects, e.g., data 662. In some aspects, executing the at least one data instruction may comprise performing one or more operations, where the one or more operations may include at least one of a matrix multiplication operation or a convolution operation. The at least one data instruction may correspond to code or shader code. Also, the at least one data instruction may be executed based on a machine learning application or a neural network (NN).

Figure 7:
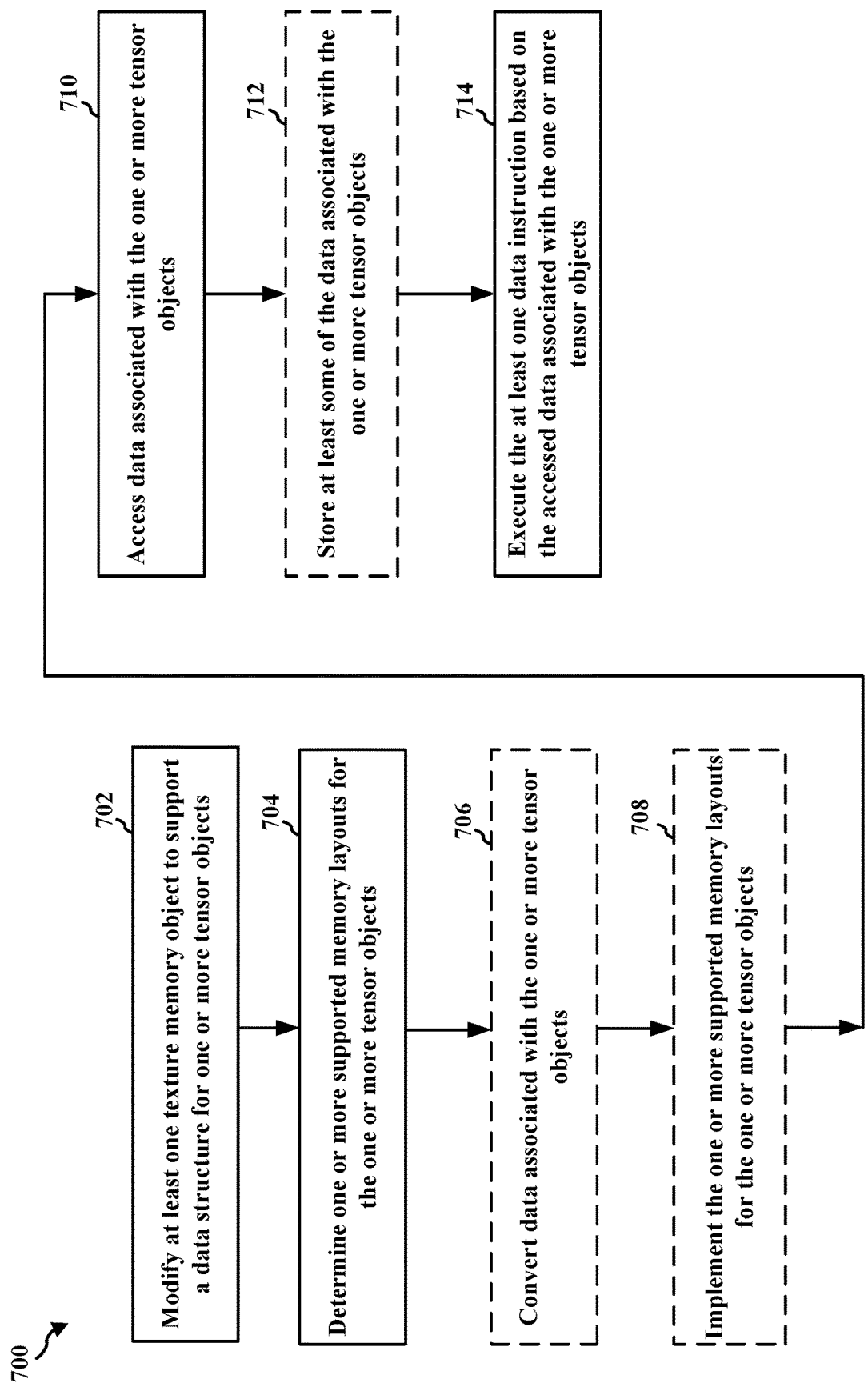
FIG. 7 is a flowchart of an example method of graphics processing in accordance with one or more techniques of this disclosure.

FIG. 7 is a flowchart 700 of an example method of graphics processing in accordance with one or more techniques of this disclosure. The method may be performed by an apparatus, such as an apparatus for graphics processing, a GPU or other graphics processor, a shader processor, a texture processor, a wireless communication device, and/or any apparatus that can perform graphics processing as used in connection with the examples of FIGS. 1-6.

At 702, the apparatus may modify at least one texture memory object to support a data structure for one or more tensor objects, as described in connection with the examples in FIGS. 1-6. For example, GPU 602 may modify at least one texture memory object to support a data structure for one or more tensor objects. Further, processing unit 120 may perform 702. In some aspects, modifying the at least one texture memory object may include at least one of rearranging data for the one or more tensor objects or mapping data for the one or more tensor objects, as described in connection with the examples in FIGS. 1-6. Additionally, the at least one texture memory object may correspond to a two-dimensional (2D) structure or a three-dimensional (3D) structure, and the one or more tensor objects may correspond to a three-dimensional (3D) structure or a four-dimensional (4D) structure, as described in connection with the examples in FIGS. 1-6.

At 704, the apparatus may determine one or more supported memory layouts for the one or more tensor objects based on the modified at least one texture memory object, as described in connection with the examples in FIGS. 1-6. For example, GPU 602 may determine one or more supported memory layouts for the one or more tensor objects based on the modified at least one texture memory object. Further, processing unit 120 may perform 704. The one or more supported memory layouts may correspond to a data structure for the one or more tensor objects, as described in connection with the examples in FIGS. 1-6. Also, the one or more supported memory layouts may be associated with one or more packing types for the one or more tensor objects, as described in connection with the examples in FIGS. 1-6. Further, the one or more supported memory layouts may be associated with at least one dimension, the at least one dimension including at least one of a width, a height, a feature, or a batch, as described in connection with the examples in FIGS. 1-6.

At 706, the apparatus may convert data associated with the one or more tensor objects based on the one or more supported memory layouts, as described in connection with the examples in FIGS. 1-6. For example, GPU 602 may convert data associated with the one or more tensor objects based on the one or more supported memory layouts. Further, processing unit 120 may perform 706. The data associated with the one or more tensor objects is accessed by a shader processor (SP) or a texture processor (TP), as described in connection with the examples in FIGS. 1-6.

At 708, the apparatus may implement the one or more supported memory layouts for the one or more tensor objects, as described in connection with the examples in FIGS. 1-6. For example, GPU 602 may implement the one or more supported memory layouts for the one or more tensor objects. Further, processing unit 120 may perform 708.

At 710, the apparatus may access data associated with the one or more tensor objects based on the one or more supported memory layouts, the data for each of the one or more tensor objects corresponding to at least one data instruction, as described in connection with the examples in FIGS. 1-6. For example, GPU 602 may access data associated with the one or more tensor objects based on the one or more supported memory layouts. Further, processing unit 120 may perform 710. The data associated with the one or more tensor objects may be accessed based on at least one request for the data, as described in connection with the examples in FIGS. 1-6.

At 712, the apparatus may store at least some of the data associated with the one or more tensor objects, as described in connection with the examples in FIGS. 1-6. For example, GPU 602 may store at least some of the data associated with the one or more tensor objects. Further, processing unit 120 may perform 712. In some instances, the at least some of the data may be stored in one or more general purpose registers (GPRs) or on-chip memory, as described in connection with the examples in FIGS. 1-6.

At 714, the apparatus may execute the at least one data instruction based on the accessed data associated with the one or more tensor objects, as described in connection with the examples in FIGS. 1-6. For example, GPU 602 may execute the at least one data instruction based on the accessed data associated with the one or more tensor objects. Further, processing unit 120 may perform 714. In some aspects, executing the at least one data instruction may comprise performing one or more operations, where the one or more operations may include at least one of a matrix multiplication operation or a convolution operation, as described in connection with the examples in FIGS. 1-6. The at least one data instruction may correspond to code or shader code, as described in connection with the examples in FIGS. 1-6. Moreover, the at least one data instruction may be executed based on a machine learning application or a neural network (NN), as described in connection with the examples in FIGS. 1-6.

In configurations, a method or an apparatus for graphics processing is provided. The apparatus may be a GPU, a graphics processor, or some other processor that may perform graphics processing. In aspects, the apparatus may be the processing unit 120 within the device 104, or may be some other hardware within the device 104 or another device. The apparatus may include means for modifying at least one texture memory object to support a data structure for one or more tensor objects. The apparatus may further include means for determining one or more supported memory layouts for the one or more tensor objects based on the modified at least one texture memory object. The apparatus may further include means for accessing data associated with the one or more tensor objects based on the one or more supported memory layouts, the data for each of the one or more tensor objects corresponding to at least one data instruction. The apparatus may further include means for executing the at least one data instruction based on the accessed data associated with the one or more tensor objects. The apparatus may further include means for converting the data associated with the one or more tensor objects based on the one or more supported memory layouts. The apparatus may further include means for implementing the one or more supported memory layouts for the one or more tensor objects. The apparatus may further include means for storing at least some of the data associated with the one or more tensor objects.

The subject matter described herein can be implemented to realize one or more benefits or advantages. For instance, the described graphics processing techniques can be used by a GPU, a graphics processor, or some other processor that can perform graphics processing to implement the data packing techniques described herein. This can also be accomplished at a low cost compared to other graphics processing techniques. Moreover, the graphics processing techniques herein can improve or speed up data processing or execution. Further, the graphics processing techniques herein can improve resource or data utilization and/or resource efficiency. Additionally, aspects of the present disclosure can utilize data packing in order to improve tensor object support and/or reduce performance overhead.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects.

Unless specifically stated otherwise, the term "some" refers to one or more and the term "or" may be interpreted as "and/or" where context does not dictate otherwise. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium.

In accordance with this disclosure, the term "or" may be interrupted as "and/or" where context does not dictate otherwise. Additionally, while phrases such as "one or more" or "at least one" or the like may have been used for some features disclosed herein but not others, the features for which such language was not used may be interpreted to have such a meaning implied where context does not dictate otherwise.

In one or more examples, the functions described herein may be implemented in hardware, software, firmware, or any combination thereof. For example, although the term "processing unit" has been used throughout this disclosure, such processing units may be implemented in hardware, software, firmware, or any combination thereof. If any function, processing unit, technique described herein, or other module is implemented in software, the function, processing unit, technique described herein, or other module may be stored on or transmitted over as one or more instructions or code on a computer-readable medium. Computer-readable media may include computer data storage media or communication media including any medium that facilitates transfer of a computer program from one place to another. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage or other magnetic storage devices. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. A computer program product may include a computer-readable medium.

The code may be executed by one or more processors, such as one or more digital signal processors (DSPs), general purpose microprocessors, application specific integrated circuits (ASICs), arithmetic logic units (ALUs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs, e.g., a chip set. Various components, modules or units are described in this disclosure to emphasize functional aspects of devices configured to perform the disclosed techniques, but do not necessarily need realization by different hardware units. Rather, as described above, various units may be combined in any hardware unit or provided by a collection of inter-operative hardware units, including one or more processors as described above, in conjunction with suitable software and/or firmware. Accordingly, the term "processor," as used herein may refer to any of the foregoing structure or any other structure suitable for implementation of the techniques described herein. Also, the techniques may be fully implemented in one or more circuits or logic elements.

The following aspects are illustrative only and may be combined with other aspects or teachings described herein, without limitation.

Aspect 1 is a method of graphics processing. The method includes modifying at least one texture memory object to support a data structure for one or more tensor objects; determining one or more supported memory layouts for the one or more tensor objects based on the modified at least one texture memory object; accessing data associated with the one or more tensor objects based on the one or more supported memory layouts, the data for each of the one or more tensor objects corresponding to at least one data instruction; and executing the at least one data instruction based on the accessed data associated with the one or more tensor objects.

Aspect 2 is the method of aspect 1, further including converting the data associated with the one or more tensor objects based on the one or more supported memory layouts.

Aspect 3 is the method of any of aspects 1 and 2, where modifying the at least one texture memory object includes at least one of rearranging data for the one or more tensor objects or mapping data for the one or more tensor objects.

Aspect 4 is the method of any of aspects 1 to 3, further including implementing the one or more supported memory layouts for the one or more tensor objects.

Aspect 5 is the method of any of aspects 1 to 4, where the one or more supported memory layouts correspond to the data structure for the one or more tensor objects.

Aspect 6 is the method of any of aspects 1 to 5, where the one or more supported memory layouts are associated with one or more packing types for the one or more tensor objects.

Aspect 7 is the method of any of aspects 1 to 6, further including storing at least some of the data associated with the one or more tensor objects.

Aspect 8 is the method of any of aspects 1 to 7, where the at least some of the data is stored in one or more general purpose registers (GPRs) or on-chip memory.

Aspect 9 is the method of any of aspects 1 to 8, where executing the at least one data instruction comprises performing one or more operations, the one or more operations including at least one of a matrix multiplication operation or a convolution operation.

Aspect 10 is the method of any of aspects 1 to 9, where the one or more supported memory layouts are associated with at least one dimension, the at least one dimension including at least one of a width, a height, a feature, or a batch.

Aspect 11 is the method of any of aspects 1 to 10, where the at least one data instruction corresponds to code or shader code.

Aspect 12 is the method of any of aspects 1 to 11, where the data associated with the one or more tensor objects is accessed based on at least one request for the data.

Aspect 13 is the method of any of aspects 1 to 12, where the at least one texture memory object corresponds to a two-dimensional (2D) structure or a three-dimensional (3D) structure, and where the one or more tensor objects correspond to a three-dimensional (3D) structure or a four-dimensional (4D) structure.

Aspect 14 is the method of any of aspects 1 to 13, where the data associated with the one or more tensor objects is accessed by a shader processor (SP) or a texture processor (TP).

Aspect 15 is the method of any of aspects 1 to 14, where the at least one data instruction is executed based on a machine learning application or a neural network (NN).

Aspect 16 is an apparatus for graphics processing including at least one processor coupled to a memory and configured to implement a method as in any of aspects 1 to 15.

Aspect 17 is an apparatus for graphics processing including means for implementing a method as in any of aspects 1 to 15.

Aspect 18 is a computer-readable medium storing computer executable code, the code when executed by at least one processor causes the at least one processor to implement a method as in any of aspects 1 to 15.

What is claimed is:

1. A method of graphics processing, comprising:
modifying at least one texture memory object to support a data structure for one or more tensor objects, wherein the at least one texture memory object corresponds to a two-dimensional (2D) structure or a first three-dimensional (3D) structure, and wherein the one or more tensor objects correspond to a second three-dimensional (3D) structure or a four-dimensional (4D) structure;
determining one or more supported memory layouts for the one or more tensor objects based on the modified at least one texture memory object, wherein the one or more supported memory layouts are associated with at least one dimension, the at least one dimension including at least one of a width, a height, a feature, or a batch;

converting data associated with the one or more tensor objects based on the one or more supported memory layouts;

implementing the one or more supported memory layouts for the one or more tensor objects;

accessing the data associated with the one or more tensor objects based on the one or more supported memory layouts, the data for each of the one or more tensor objects corresponding to at least one data instruction; and executing the at least one data instruction based on the accessed data associated with the one or more tensor objects.

2. The method of claim 1, wherein modifying the at least one texture memory object includes at least one of rearranging the data associated with the one or more tensor objects or mapping the data associated with the one or more tensor objects.

3. The method of claim 1, wherein the one or more supported memory layouts correspond to the data structure for the one or more tensor objects.

4. The method of claim 1, wherein the one or more supported memory layouts are associated with one or more packing types for the one or more tensor objects.

5. The method of claim 1, further comprising:
storing at least some of the data associated with the one or more tensor objects.

6. The method of claim 5, wherein the at least some of the data is stored in one or more general purpose registers (GPRs) or on-chip memory.

7. The method of claim 1, wherein executing the at least one data instruction comprises performing one or more operations, the one or more operations including at least one of a matrix multiplication operation or a convolution operation.

8. The method of claim 1, wherein the at least one data instruction corresponds to code or shader code.

9. The method of claim 1, wherein the data associated with the one or more tensor objects is accessed based on at least one request for the data.

10. The method of claim 1, wherein the data associated with the one or more tensor objects is accessed by a shader processor (SP) or a texture processor (TP).

11. The method of claim 1, wherein the at least one data instruction is executed based on a machine learning application or a neural network (NN).

12. An apparatus for graphics processing, comprising:
a memory; and
at least one processor coupled to the memory and configured to:
modify at least one texture memory object to support a data structure for one or more tensor objects, wherein the at least one texture memory object corresponds to a two-dimensional (2D) structure or a first three-dimensional (3D) structure, and wherein the one or more tensor objects correspond to a second three-dimensional (3D) structure or a four-dimensional (4D) structure;
determine one or more supported memory layouts for the one or more tensor objects based on the modified at least one texture memory object, wherein the one or more supported memory layouts are associated with at least one dimension, the at least one dimension including at least one of a width, a height, a feature, or a batch;

convert data associated with the one or more tensor objects based on the one or more supported memory layouts;

implement the one or more supported memory layouts for the one or more tensor objects;

access the data associated with the one or more tensor objects based on the one or more supported memory layouts, the data for each of the one or more tensor objects corresponding to at least one data instruction; and execute the at least one data instruction based on the accessed data associated with the one or more tensor objects.

13. The apparatus of claim 12, wherein to modify the at least one texture memory object includes at least one of rearranging the data associated with the one or more tensor objects or mapping the data associated with the one or more tensor objects.

14. The apparatus of claim 12, wherein the one or more supported memory layouts correspond to the data structure for the one or more tensor objects.

15. The apparatus of claim 12, wherein the one or more supported memory layouts are associated with one or more packing types for the one or more tensor objects.

16. The apparatus of claim 12, wherein the at least one processor is further configured to:
store at least some of the data associated with the one or more tensor objects.

17. The apparatus of claim 16, wherein the at least some of the data is stored in one or more general purpose registers (GPRs) or on-chip memory.

18. The apparatus of claim 12, wherein to execute the at least one data instruction comprises the at least one processor configured to perform one or more operations, the one or more operations including at least one of a matrix multiplication operation or a convolution operation.

19. The apparatus of claim 12, wherein the at least one data instruction corresponds to code or shader code.

20. The apparatus of claim 12, wherein the data associated with the one or more tensor objects is accessed based on at least one request for the data.

21. The apparatus of claim 12, wherein the data associated with the one or more tensor objects is accessed by a shader processor (SP) or a texture processor (TP).

22. The apparatus of claim 12, wherein the at least one data instruction is executed based on a machine learning application or a neural network (NN).

23. An apparatus for graphics processing, comprising:
means for modifying at least one texture memory object to support a data structure for one or more tensor objects, wherein the at least one texture memory object corresponds to a two-dimensional (2D) structure or a first three-dimensional (3D) structure, and wherein the one or more tensor objects correspond to a second three-dimensional (3D) structure or a four-dimensional (4D) structure;
means for determining one or more supported memory layouts for the one or more tensor objects based on the modified at least one texture memory object, wherein the one or more supported memory layouts are associated with at least one dimension, the at least one dimension including at least one of a width, a height, a feature, or a batch;
means for converting data associated with the one or more tensor objects based on the one or more supported memory layouts;

means for implementing the one or more supported memory layouts for the one or more tensor objects;

means for accessing the data associated with the one or more tensor objects based on the one or more supported memory layouts, the data for each of the one or more tensor objects corresponding to at least one data instruction; and means for executing the at least one data instruction based on the accessed data associated with the one or more tensor objects.

24. A non-transitory computer-readable medium storing computer executable code for graphics processing, the code when executed by a processor causes the processor to:

modify at least one texture memory object to support a data structure for one or more tensor objects, wherein the at least one texture memory object corresponds to a two-dimensional (2D) structure or a first three-dimensional (3D) structure, and wherein the one or more tensor objects correspond to a second three-dimensional (3D) structure or a four-dimensional (4D) structure;

determine one or more supported memory layouts for the one or more tensor objects based on the modified at least one texture memory object, wherein the one or more supported memory layouts are associated with at least one dimension, the at least one dimension including at least one of a width, a height, a feature, or a batch;

convert data associated with the one or more tensor objects based on the one or more supported memory layouts;

implement the one or more supported memory layouts for the one or more tensor objects;

access the data associated with the one or more tensor objects based on the one or more supported memory layouts, the data for each of the one or more tensor objects corresponding to at least one data instruction; and execute the at least one data instruction based on the accessed data associated with the one or more tensor objects.

* * * * *